(12) United States Patent
Eubanks

(10) Patent No.: US 11,749,896 B1
(45) Date of Patent: Sep. 5, 2023

(54) OMNI-DIRECTIONAL BROADBAND LOW DISTORTION COAXIAL HORN ANTENNA

(71) Applicant: Massive Light, LLC, Spring, TX (US)

(72) Inventor: Travis Eubanks, San Antonio, TX (US)

(73) Assignee: Massive Light, LLC, Spring, TX (US)

( * ) Notice: Subject to any disclaimer, the term of this patent is extended or adjusted under 35 U.S.C. 154(b) by 191 days.

(21) Appl. No.: 17/300,418

(22) Filed: Jun. 23, 2021

Related U.S. Application Data

(60) Provisional application No. 63/044,423, filed on Jun. 26, 2020, provisional application No. 63/042,758, filed on Jun. 23, 2020.

(51) Int. Cl.
*H01Q 13/02* (2006.01)
*H01Q 5/55* (2015.01)

(52) U.S. Cl.
CPC ........... *H01Q 13/02* (2013.01); *H01Q 5/55* (2015.01)

(58) Field of Classification Search
CPC .................. H01Q 5/55; H01Q 13/02–065
See application file for complete search history.

(56) References Cited

U.S. PATENT DOCUMENTS

| | | | |
|---|---|---|---|
| 8,526,904 B2 | 9/2013 | Gard et al. | |
| 8,928,546 B1 * | 1/2015 | Eubanks | H01Q 13/02 343/773 |
| 10,431,893 B1 * | 10/2019 | Sethi | H01Q 5/25 |
| 10,916,855 B1 * | 2/2021 | Rivera | H01Q 21/205 |
| 2009/0227214 A1 | 9/2009 | Georgantas et al. | |
| 2017/0025750 A1 * | 1/2017 | Su | H01Q 1/50 |
| 2021/0044325 A1 * | 2/2021 | Scherz | H01Q 21/28 |
| 2021/0091784 A1 | 3/2021 | Tseng et al. | |

* cited by examiner

*Primary Examiner* — Graham P Smith
*Assistant Examiner* — Amal Patel
(74) *Attorney, Agent, or Firm* — Vincent J. Allen; James H. Ortega; Carstens, Allen & Gourley, LLP

(57) ABSTRACT

Disclosed herein is an omni-directional low distortion broadband coaxial horn antenna that supports a wireless bandwidth of 2-12 GHz with an instantaneous bandwidth up to 6 GHz wide within that 2-12 GHz range. These exemplary frequencies represent a single embodiment, but do not limit the range of possible frequencies the antenna can cover based on its design equations and scalability to other frequency ranges. In general, the antenna's dielectric shape is an hourglass cylindrical annulus with a curved conical void. The annular hole in the center of the antenna allows transmission line connection to the conductive surfaces applied to both the conical subtraction from the annulus and to the antenna's base. The present invention is not limited by this embodiment and also includes any embodiment of a cylindrical annulus with a conical void as determined in the manner disclosed herein and having conductive surfaces applied to it for electromagnetic radiation.

20 Claims, 11 Drawing Sheets

OMNI-DIRECTIONAL BROADBAND LOW DISTORTION COAXIAL HORN ANTENNA

RELATED APPLICATIONS

The present disclosure claims priority to U.S. Provisional Patent Application No. 63/042,758, filed Jun. 23, 2020, and U.S. Provisional Patent Application No. 63/044,423, filed Jun. 26, 2020, both of which are incorporated herein by reference in their entireties for all purposes. The present disclosure is also related to commonly owned U.S. patent application Ser. No. 17/300,416, filed Jun. 23, 2021, which is also incorporated herein by reference in its entirety for all purposes.

STATEMENT REGARDING FEDERALLY SPONSORED RESEARCH OR DEVELOPMENT

The present disclosure includes important technology that, while not developed through federally sponsored research or development, provides crucial military advantages employable by the Department of Defense of the United States of America in the areas of covert and anti-jam communications, signals intelligence including direction finding of signals, satellite communications, radars and emulators, drone-to-ground communications, force collaboration for reduced deployment cost, and electronic warfare. However, disclosure of the technology described herein to enemies of the U.S. would likely negate the unique strategic advantages provided by this technology. Therefore, in view of ongoing development discussions between the Assignee of the present disclosure and multiple Defense Agencies of the U.S., a Secrecy Order for the present application, as well as the co-pending related application identified above, is strongly advised and is hereby requested.

TECHNICAL FIELD

The present disclosure relates generally to antenna technology for use in military applications, and more particularly relates to a new omni-directional low-distortion broadband coaxial horn antenna employable for military covert and anti-jam communications, signals intelligence including direction finding of signals, satellite communications, radars and emulators, drone-to-ground communications, force collaboration for reduced deployment cost, and electronic warfare.

BACKGROUND

Ultra-Wideband (UWB) communication systems can operate over multiple Gigahertz of the frequency spectrum, as allocated by the Federal Communication Commission. A system that is able to use large sections of its UWB bandwidth instantaneously can achieve extremely high data rates that are desirable for any communication system, for example, a wireless local area network (LAN). Alternatively, such a system can tolerate ultra-low power transmissions, which are useful in applications such as multiple-radio undetectable communications, for example, ultra-low power frequency spreading systems.

Conventional UWB antennas provide omni-directional patterns, and can use the entire UWB spectrum instantaneously. One conventional example of a wideband omni-directional antenna is a planar UWB monopole, realized as a triangular shape above a ground plane. However, the conventional UWB antennas exhibit unwanted levels of phase distortion in their transmission and reception capabilities. This is because a planar UWB monopole antenna cannot track phase changes of the transmit signal due to the constraints of the designed shape of its conductive components.

A newer UWB antenna is found in U.S. Pat. No. 8,928,546. This coaxial antenna produces an omni-directional pattern across the entire UWB spectrum instantaneously and exhibits a lower level of phase distortion than conventional monopole-based antennas. This UWB antenna employs differently shaped and mutually non-conformal surfaces of coaxial conductive elements designed for cooperation to provide phase distortion correction by causing the lowest frequency information, the mid band frequency information, and the highest frequency information to arrive at their destination at approximately the same time.

However, this coaxial antenna is configured to provide an omni-directional pattern across the UWB spectrum, which ranges from 3.1-10.6 GHz, and therefore does not provide low distortion with an omni-directional pattern at lower frequencies, such as at the ubiquitous 2.4 GHz band. In addition, given the broad range of the UWB spectrum, an antenna of this conventional type cannot achieve both dispersion-free data transfer and maximal omni-directional gain at all frequencies of the UWB spectrum. Consequently, the mutually cooperating non-conformal surfaces of the coaxial conductive elements is designed such that the maximum omni-directional horizontal gain is near the center of the UWB band (6.85 GHz). Stated another way, this antenna design sacrifices omni-directional horizontal gain at higher and lower ends of the UWB spectrum in order to provide low distortion and dispersion-free data transfer across the UWB spectrum.

Accordingly, what is needed in the art is an improved omni-directional low distortion coaxial antenna that performs optimally at a lower frequency spectrum than the conventional UWB spectrum, including performance at 2.4 GHz. The disclosed principles provide such an improved coaxial antenna that does not suffer from the deficiencies of conventional designs. Additionally, the disclosed principles provide for the reduction of the number of major components required to construct an omni-directional low distortion antenna as compared to previous antenna designs.

SUMMARY

The disclosed principles provide for a new omni-directional low distortion broadband coaxial horn antenna that supports a wireless bandwidth of 2-12 GHz with a very large instantaneous bandwidth up to 6 GHz wide within that 2-12 GHz range. These exemplary frequencies represent a single disclosed embodiment, but do not limit the range of possible frequencies that this invention can cover based on its design equations, claims, and scalability to other frequency ranges. Moreover, an antenna constructed in accordance with the disclosed principles is scalable in size to achieve any center frequency. The fractional bandwidth (bandwidth/center frequency %) is very large and flexible (e.g., up to approx. 143%). Additionally, the disclosed antenna provides this scalable advantage with low distortion across this very large range, which would also be scalable for any size (and frequency) desired.

In addition, the disclosed antenna is provided with a lower manufacturing cost and greater efficiency than previous UWB coaxial antennas. The improvements of the disclosed antenna design, including its governing equations, are discussed in detail below. In general, the antenna's dielectric shape is an hourglass cylindrical annulus with a curved conical void. The annular hole in the center of the antenna allows a transmission line to be connected to the conductive surfaces applied to both the conical subtraction from the annulus and to the antenna's base. The present invention is not limited by this embodiment only but also includes any embodiment of a cylindrical annulus with a conical void having conductive surfaces applied to it for electromagnetic radiation.

In one embodiment, the disclosed principles provide for an omni-directional low distortion coaxial antenna comprising a dielectric component constructed of a radio frequency transparent material. In one embodiment, the dielectric component may comprise a longitudinally extending exterior surface having a hyperboloid of one sheet shape, and an aperture longitudinally extending from a top end to a bottom end of the dielectric component. In such embodiments, the aperture defines an interior surface of the dielectric component having a frusto-pseudosphere shape where a top opening of the aperture is greater than a bottom opening of the aperture. The exemplary dielectric component may also include a circular base at the bottom end of the component, and having the bottom opening of the aperture at its center. Such a base may comprise a flat inner portion extending outwardly from the bottom opening of the aperture, and a curved portion having a parabolic shape curving upward toward the top end of the dielectric component and extending outwardly from the flat portion of the base to the exterior surface of the dielectric component. In addition, such exemplary embodiments of the antenna would include an electrical conductor disposed on the interior surface of the dielectric component, and an electrical conductor disposed on the curved portion of the base.

BRIEF DESCRIPTION OF THE DRAWINGS

The novel features believed characteristic of the disclosure are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies. The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Also, the use of terms herein such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

Figure 1:
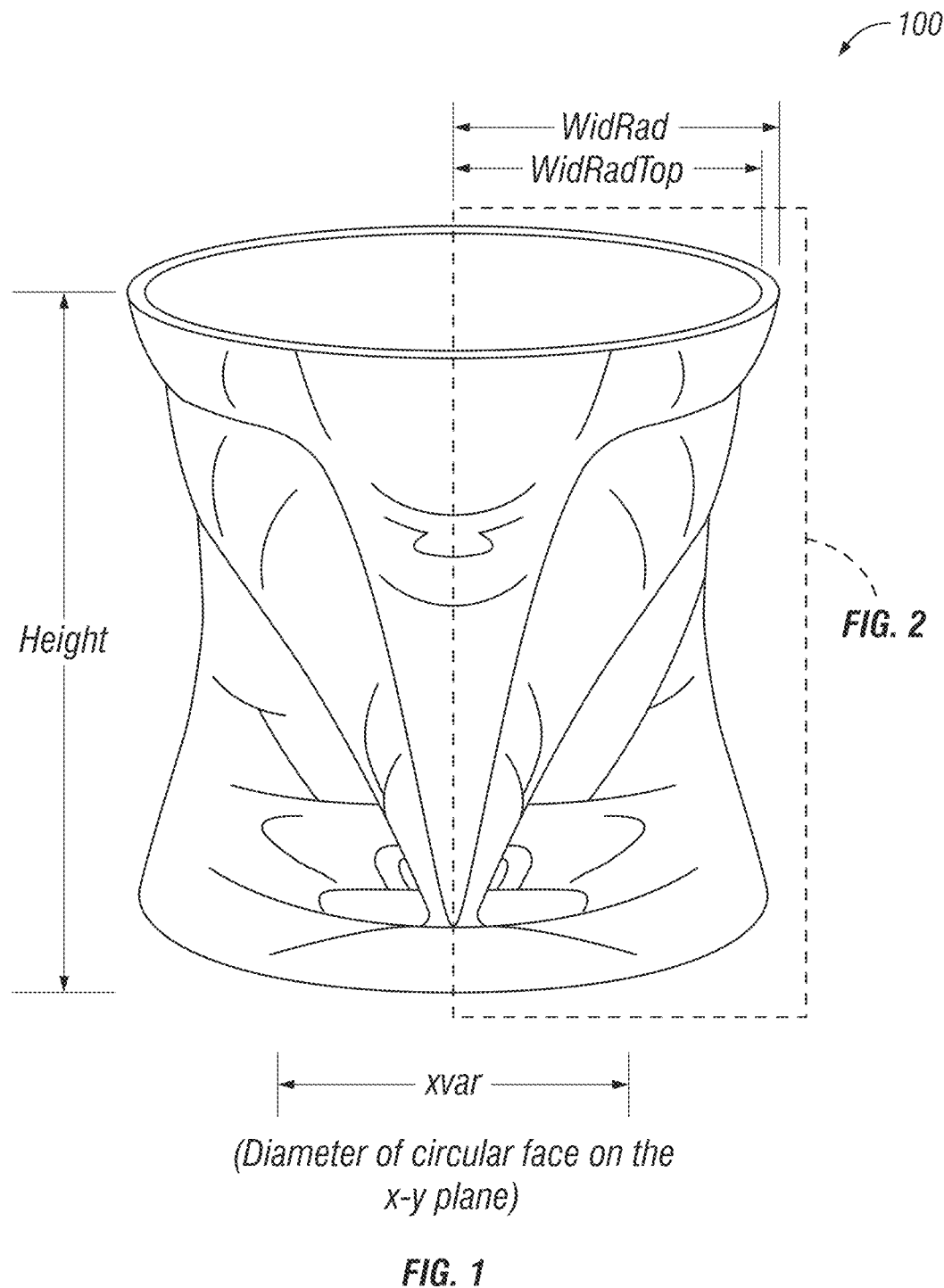
FIG. 1 illustrates a three-dimensional image of the dielectric component for an omni-directional low distortion coaxial horn antenna in accordance with the disclosed principles.

Looking initially at FIG. 1, illustrated is a three-dimensional image of the dielectric component 100 for an omni-directional low distortion broadband coaxial horn antenna in accordance with the disclosed principles. The material used to create the dielectric component 100 of the disclosed antenna structure is advantageously selected to be polycarbonate, but it could also be fabricated with polytetrafluoroethylene (PTFE or Teflon®) or other radio frequency transparent materials. This dielectric component 100 can be manufactured with 3D printing, injection molding, CNC machining, and other techniques.

The shape of the dielectric component 100 is unique to the disclosed principles. In particular, the dielectric component comprises a longitudinally extending exterior wall of surface having a "hyperboloid of one sheet" shape. In addition, the dielectric component 100 includes an aperture longitudinally extending from a top to a bottom of the dielectric component 100. The aperture defines an interior surface of the dielectric component 100 having a frusto-pseudosphere shape where a top opening of the aperture is greater than a bottom opening of the aperture. This shape for the aperture may also be known as a truncated "Gabriel's horn" or a truncated lower half of a tractricoid. The illustrated dielectric component 100 also includes a circular base having the bottom opening of the aperture at its center. The base also comprises a flat inner portion extending outwardly from the bottom opening of the aperture, and a curved portion having a parabolic shape curving upward toward the top of the dielectric component 100 and extending outwardly from the flat portion of the base to the exterior surface or wall of the dielectric component 100. This curved portion may also be described as the uppermost portion of a torus or donut shape.

Conventional UWB spectrum coaxial antennas typically require 4 main components that are adhered together, and therefore the employment of a single main component 100 significantly reduces the fabrication cost required. An antenna in accordance with the disclosed principles is optimized to perform efficiently with low distortion from 2-12 GHz, which is significantly broader in bandwidth than conventional 3.1-10.6 GHz designs. In an exemplary embodiment, the optimized size for the polycarbonate dielectric component 100 is approximately 2.7×2.7×2.7 cm. A cross-section of one-half of the illustrated dielectric component 100 is provided in the plot of FIG. 2 to illustrate the novel curvatures of the exterior surface, the interior surface, and the curved portion of the base of the component 100, which work together to permit an omni-directional broadband coaxial horn antenna constructed with such a dielectric component 100 to perform efficiently with low distortion from the 2-12 GHz bandwidth range.

Figure 2:
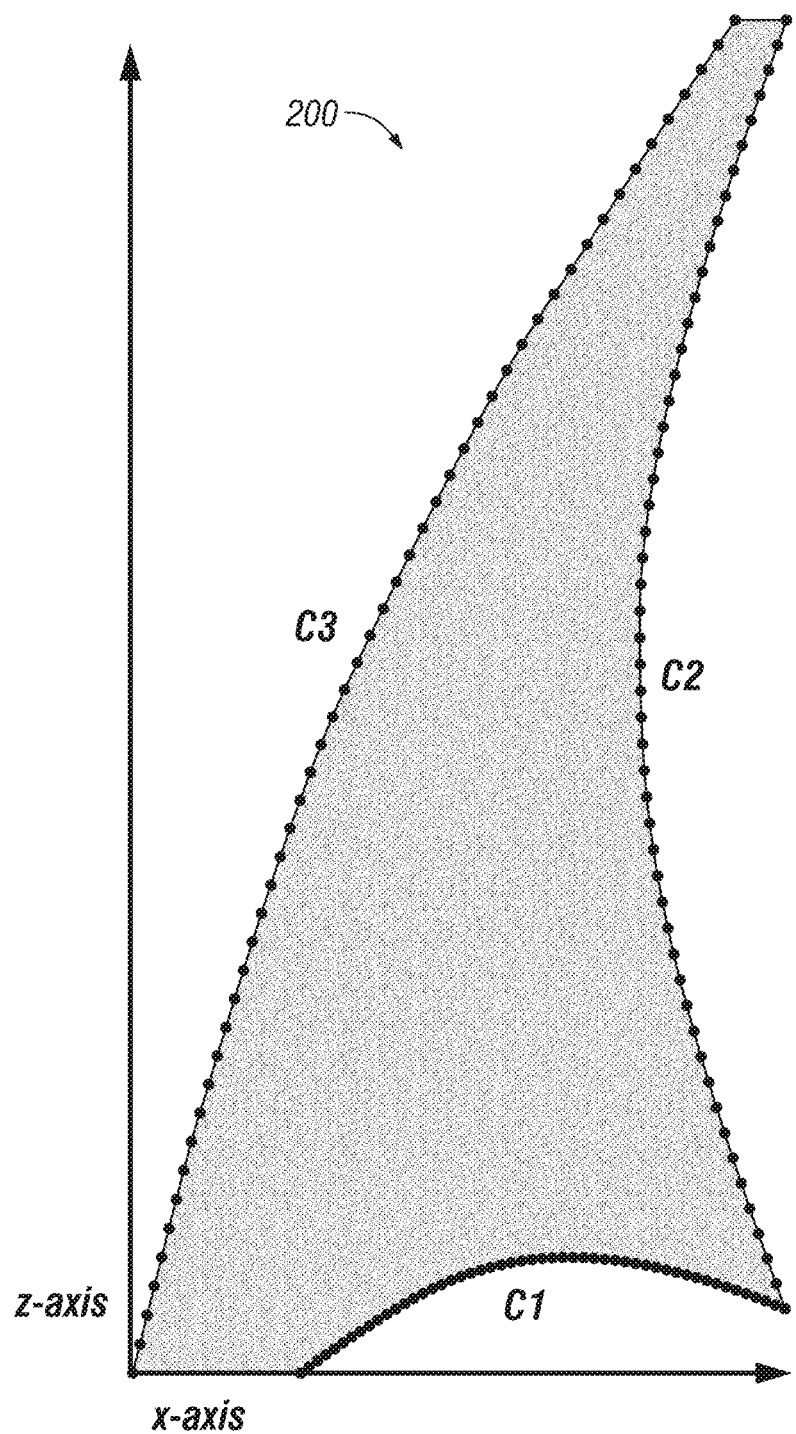
FIG. 2 illustrates an x-axis/z-axis plot of the profile of the curvatures (C1, C2, and C3) defining the surfaces of the dielectric component, which is defined by the rotation of these curvatures around the z-axis.

A dielectric component designed and constructed in accordance with the disclosed principles has height, diameter, and governing equations that were altered from conventionally designed UWB spectrum coaxial antennas such that they support a 2-12 GHz wireless bandwidth, rather than the conventional UWB bandwidth of 3.1-10.6 GHz. FIG. 2 illustrates an x-axis/z-axis plot 200 of the profile of the illustrated curvatures (C1, C2, C3) used to create a dielectric component in accordance with the disclosed principles by rotation around the z-axis. In FIG. 2, the x-axis is the horizontal axis and the z-axis is the vertical axis. The equations provided in FIG. 2 (measurements provided in millimeters) are used to provide the specific curvatures (C1 for the curved portion of the base, C2 for the exterior surface, and C3 for the interior surface) of the surfaces of the dielectric component 100 illustrated in FIG. 1 such that a low distortion, omni-directional pattern is provided across the frequency range of 2-12 GHz. Depending on the desired bandwidth and the dielectric material chosen for the component 100, the optimized variables shown in the equations set forth in FIG. 2 may change to provide maximal efficiency and minimal distortion for the antenna.

During the design process for this antenna, the equations for the governing curvatures (C1, C2, and C3) were designed originally as straight lines in which the d equations ($d_1$, $d_2$, and $d_3$, respectively) were equal to 0. In order to improve the antenna's radiation efficiency and further reduce its weight, the sinusoidal d equations were added to the governing curvatures (C1, C2, and C3) with their vector components split between the x and z dimensions, according to the elevation angles ($\theta_1$, $\theta_2$, and $\theta_3$) of the parametric line equations present in C1, C2, and C3. The peak amplitudes of the d equations are equal to dBase, dDiel, and dConvex for C1, C2, and C3, respectively. Each of these curves (C1, C2, and C3) covers one-half of a period of the sinusoidal waves defined by the d equations. To enforce the half-period structure of these curves, the sFreq variable was created as a spatial frequency with relationship to the total number of points along each of the curves (C1, C2, C3), ePoints. The value of ePoints was chosen to be 51 arbitrarily because larger values for ePoints caused the Fusion 360 modeler used to create the illustrated plot to crash. The x and z equations in C1, C2, and C3 are designed parametrically around the value of i, which represents the point index, in order to be compatible with the parametric drawing tools in Fusion 360. While specific numeric values are illustrated as optimized variables for the equations set forth in FIG. 2, these values are merely exemplary based on predetermined dimension of the antenna comprised of the dielectric component and the conductors discussed below, as well as other related antenna components that may be employed with these exemplary dimensions.

The xvar variable represents the diameter of the flat circular surface on the x-y plane located at z=0 on the dielectric component (not the overall width of the component). This variable needs to be appropriately sized to connect to a transmission line. The zvar variable is the height of the last point in the curve C1. The widRad variable is the radius of the dielectric component/antenna. The widRadTop variable is the inner radius at the top of the antenna (on C3, near C2), which creates a non-zero upper rim width of the dielectric component to enforce the manufacturability of the antenna. The height variable is the antenna's height as measured along its longitudinal axis. The pRef variable is the radius of the aperture at the base of the dielectric component/antenna that enables the connection to the transmission line on the base. In the illustrated embodiment, the pRef variable was chosen to be 0.7 mm to enable a 0.13 mm (5 thousandths of an inch) friction gap between the metal pin of the transmission line connector and the dielectric surface of the antenna so that the transmission line connector could be bonded to the antenna while being held in place by friction. The values of dBase, dDiel, dConvex, xvar, zvar, widRad, widRadTop, and height were optimized with the OpenEMS electromagnetic solver through Octave by using the Euler method. As such, these specific values may change based on any alterations to the dimensions discussed herein. The units for the dBase, dDiel, dConvex, xvar, zvar, widRad, widRadTop, height, and pRef variables are millimeters. The ePoints, i, and sFreq variables are unit-less. The $\theta_1$, $\theta_2$, and $\theta_3$ variable units are radians.

While the equations shown in FIG. 2 represent optimized values for the governing curvatures (C1, C2, and C3) for a polycarbonate realization of a dielectric component in accordance with the disclosed principles herein, the d equations could be replaced by exponential, parametric, linear, non-linear, or other equation forms that could then be optimized for good antenna performance in terms of efficiency, bandwidth, gain, and distortion performance for a given antenna material. Other representations of these equations may exist, and other equations may be defined for the C1, C2, and C3 surfaces that also provide good performance for an antenna generally defined by a cylindrical annulus with a conical void.

Figure 3:
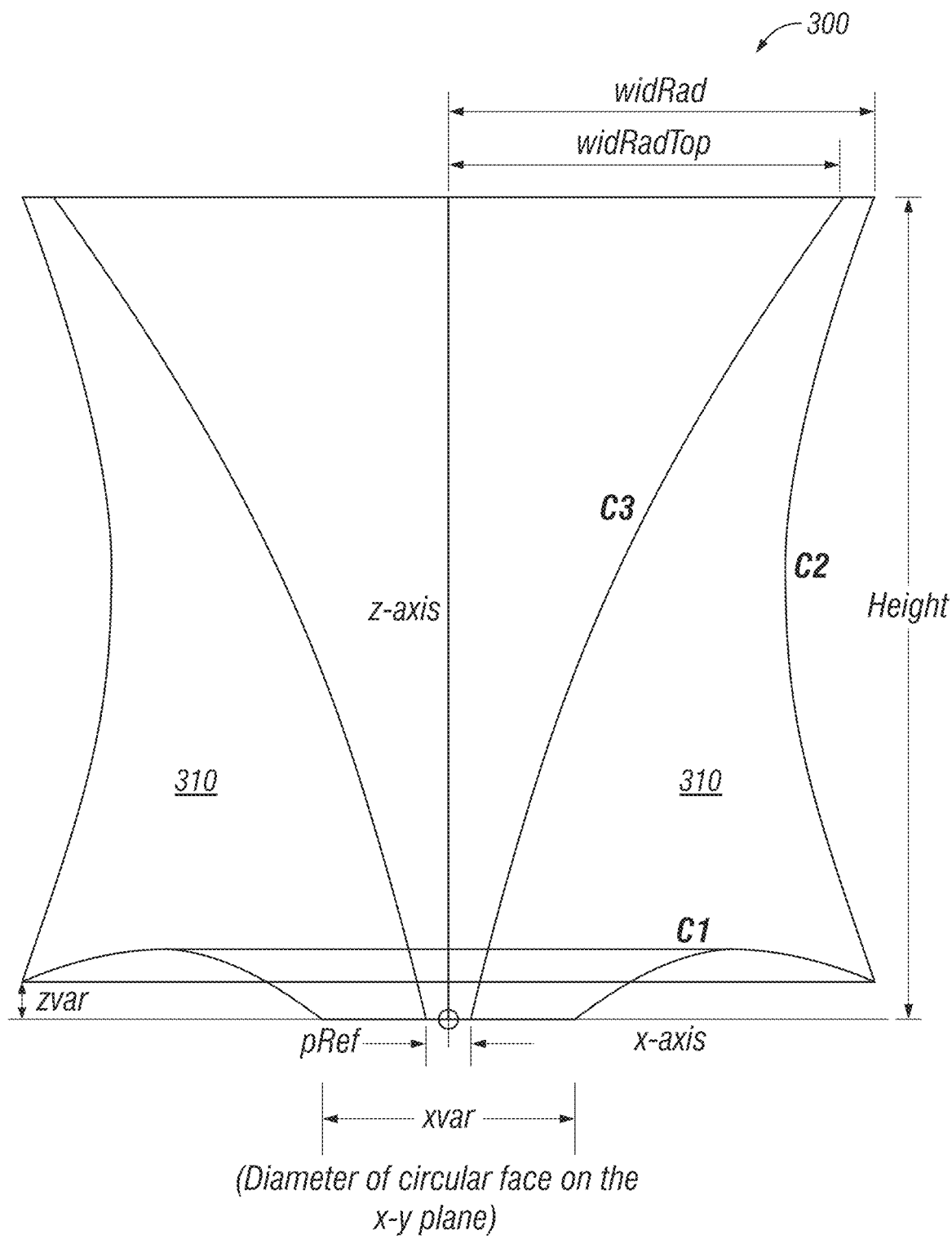
FIG. 3 illustrates a side view of the dielectric component for an omni-directional low distortion coaxial horn antenna in accordance with the disclosed principles.

Looking now at FIG. 3, illustrated is a side view of an exemplary dielectric component 300 created in accordance with the disclosed principles. As disclosed above, the dielectric component 300 may be constructed of a transparent or opaque material, such as polycarbonate, PTFE, or another material that is also radio frequency transparent. From this side view, the semitransparency of the material of the component 300 permits the three governing curvatures C1 (curved surface of the base), C2 (exterior surface), and C3 (interior surface) to be clearly seen in relation to their presentation in FIG. 2. To make an antenna constructed with the illustrated dielectric component 300 radiate, conductive surfaces must be applied to curvature surfaces C1 and C3. Since curves C1, C2 and C3 define the solid portion 310 of the dielectric component 300, a conductive surface is applied to the interior surface C3 defined within the dielectric component 300, while a conductive surface is applied to the bottom-facing curved surface C1 of the base. Also to make such an antenna radiate, a transmission line connector (such as an SMA connector, not illustrated) must be attached to the flat surface at the base, and through the bottom opening of the aperture, of the component 300 illustrated in FIG. 3. The conductive surfaces may be attached by various means including metal stamping and adhesive, conductive paint, metal ion sputtering, electroless nickel plating, electroplating, and other means. The transmission line connector (not shown) may be attached to the flat portion of the base by epoxy, soldering, brazing, screws, and friction, among other methods.

Figure 4:
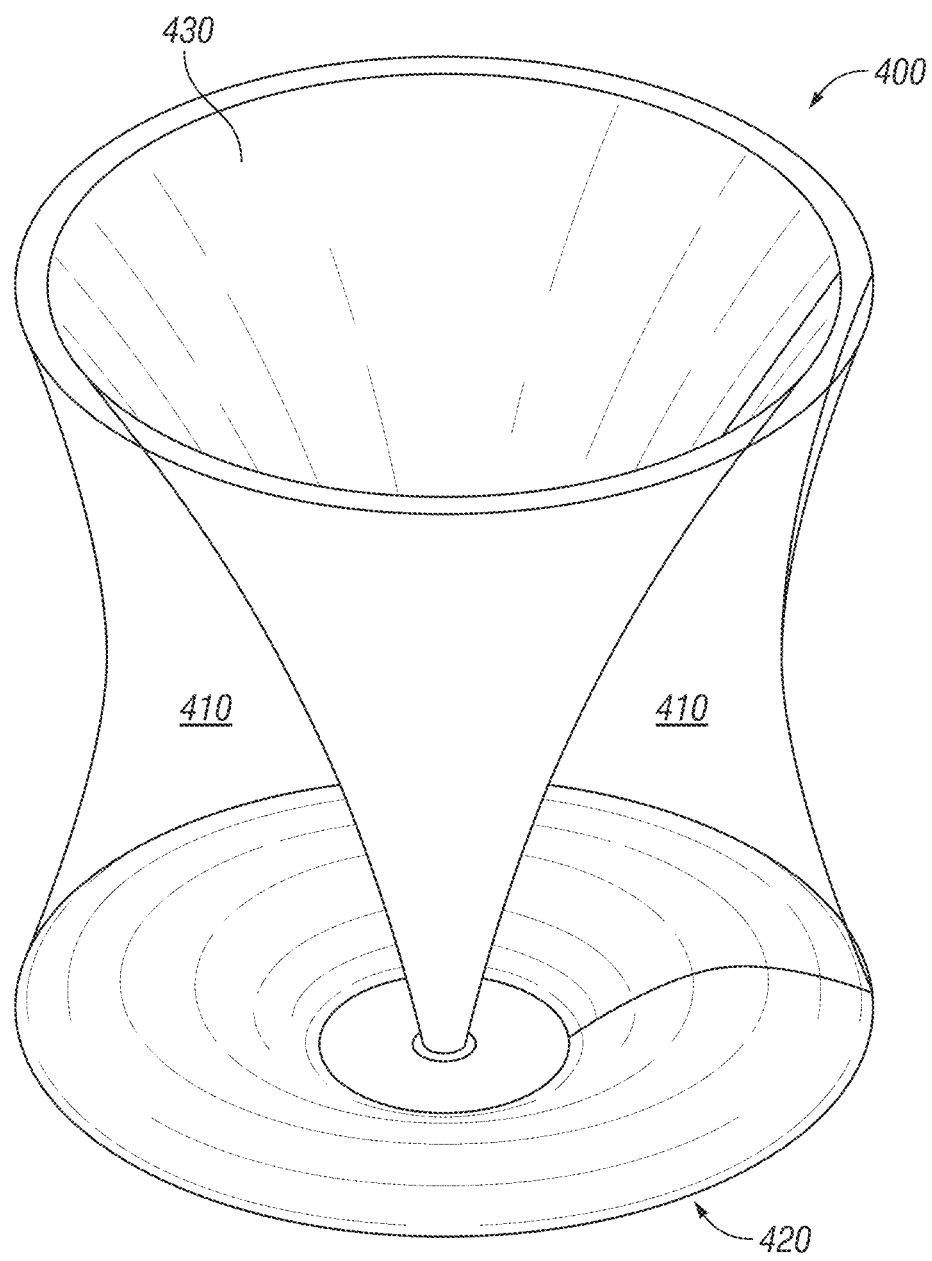
FIG. 4 illustrates the dielectric component with metal layers applied to profile curvatures C1 and C3.

FIG. 4 shows a perspective view of a metallized dielectric component 400, which is similar to the dielectric components 100 and 300 from FIG. 1 and FIG. 3. The solid wall 410 of the completed dielectric component 400 is shown as semitransparent to permit illustration of conductive surfaces 420 and 430 applied to curved surfaces C1 and C3, respectively. As discussed above, the conductive surface 420 is applied to the bottom-facing curved surface C1 of the base, and the conductive surface 430 is applied to the interior surface C3 defined by the aperture.

For the sake of low-cost construction of an antenna design using the exemplary dielectric component 400 illustrated in FIG. 4, the 842AR-Super Shield™ Silver Conductive Paint from MG Chemicals may be applied to C1 and C3 by aerosol spray, while masking curvature C2 and the boundary between C2 and C3, as well as the flat surface at the base of the dielectric component 400. The transmission line connector can be attached to this flat surface near curvature C1 to mask this flat surface during the conductive surface application to minimize construction steps. Of course, as mentioned above, any type of application process, as well as any type of advantageous conductive material, may be used to create the conductive surface 420 and 430.

Figure 5B:
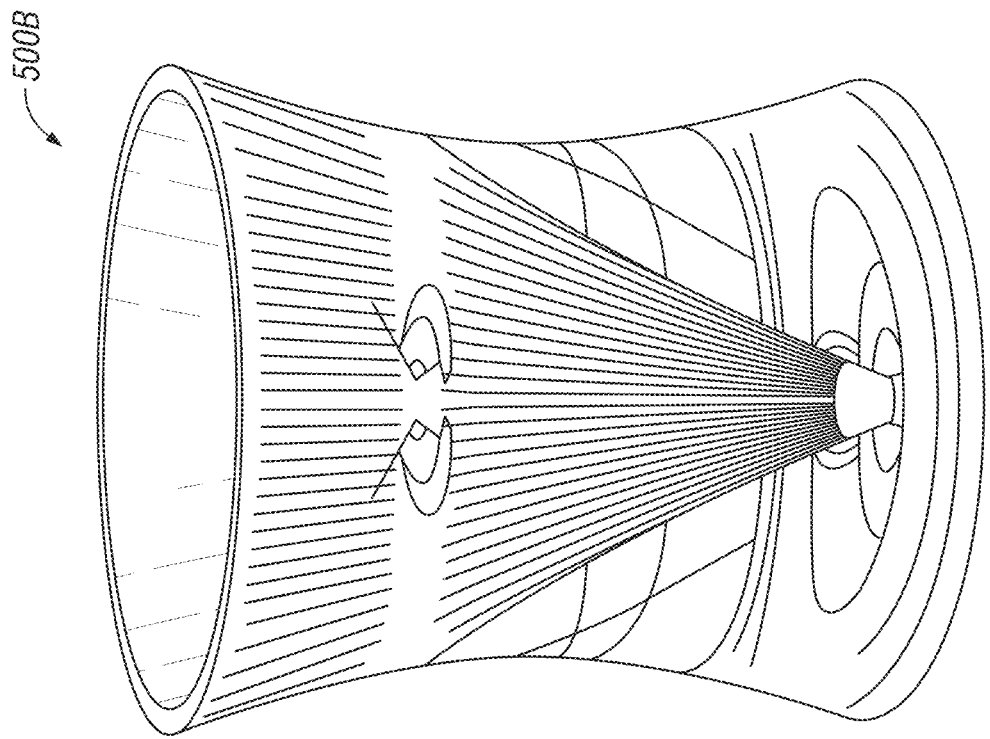
FIGS. 5A and 5B illustrate three-dimensional images of two assembled omni-directional low distortion coaxial horn antennas made with opaque and translucent materials in accordance with the disclosed principles.
Figure 5A:
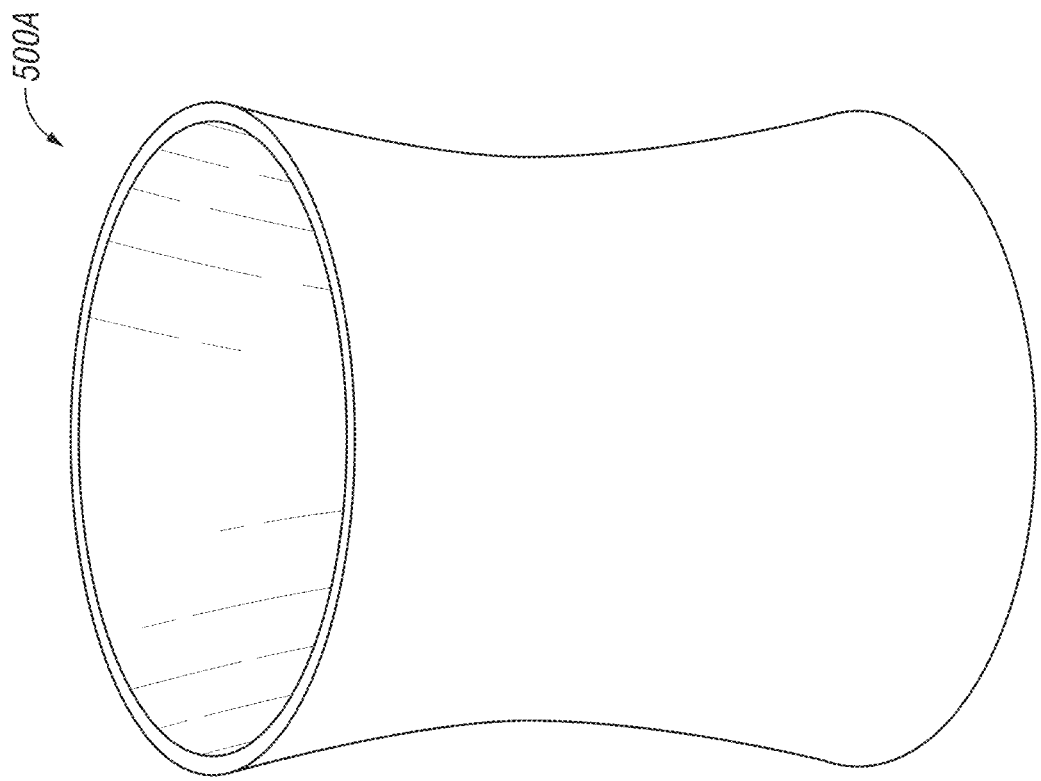

Looking now at FIG. 5, illustrated are three-dimensional images of two assembled omni-directional low distortion coaxial antennas 500A, 500B in accordance with the disclosed principles. The antenna 500A on the left of FIG. 5 shows the antenna with an opaque dielectric component such as PTFE, while the antenna 500B on the right of FIG. 5 shows the antenna with a translucent dielectric component such as polycarbonate. In the illustrated embodiments, the conductive surfaces are painted blue for visual effect, but they could be any other color. For acrylic conductive paints, such as the AR series provided by MG Chemicals, acrylic dyes can be added to affect the coloration of the conductive surfaces.

Exemplary Military Applications

A single antenna according to the disclosed principles providing the disclosed ultrawide bandwidth of 2-12 GHz lends itself to a number of military-based applications. In conventional military applications, multiple antennas, each with its own dedicated (but narrow) bandwidth are needed to provide multiple distinct applications. In contrast, a single antenna constructed in accordance with the disclosed principles replaces such multiple conventional antennas by covering the ultrawide 2-12 GHz bandwidth with a single antenna. Moreover, such a single antenna as disclosed herein may be paired with a corresponding single RF front-end circuit/system (described in U.S. Provisional Patent Application No. 63/042,758, filed Jun. 23, 2020, and U.S. patent application Ser. No. 17/300,416, filed Jun. 23, 2021, both herein incorporated by reference in their entireties for all purposes) to provide use in these multiple military applications using a single system where conventional technology required a distinct system for each such application.

Covert Communications

An antenna constructed in accordance with the disclosed principles enables small teams to transmit data and voice messages to recipients up to 100 kilometers away covertly due to the relationships between the received power level and the maximum channel capacity in the Friis Transmission Equation:

$$P_r = P_t + G_t + G_r + 20 \cdot \log_{10}\left(\frac{\lambda}{4 \cdot \pi \cdot R}\right)$$

where:
$P_r$ is the power available at the input of the receiving antenna (in dBm)(decibel-milliwatts);
$P_t$ is the output power to the transmitting antenna (in dBm)(decibel-milliwatts);
$G_t$ is the antenna gain (with respect to an isotropic radiator) of the transmitting antenna (decibels);
$G_r$ is the antenna gain (with respect to an isotropic radiator) of the receiving antenna (decibels);
$\lambda$ is the wavelength of the radio frequency (meters);
R is the distance between the transmitting and receiving antennas (meters);
and the Shannon-Hartley Theorem telling the maximum rate at which information can be transmitted over a communications channel of a specified bandwidth in the presence of noise. The Shannon-Hartley Theorem states that the channel capacity C is the theoretical tightest upper bound on the information rate of data that can be communicated at an arbitrarily low error rate using an average received signal power S through an analog communication channel subject to additive white Gaussian noise of power N:

$$C = B\log_2\left(1 + \frac{S}{N}\right)$$

where:
C is the channel capacity in bits per second, a theoretical upper bound on the net bit rate excluding error-correction codes;
B is the bandwidth of the channel in Hertz;
S is the average received signal power over the bandwidth measured in Watts (or Volts squared);
N is the average power of the noise and interference over the bandwidth measured in Watts (or Volts squared); and
S/N is the signal-to-noise ratio (SNR) of the communication signal to the noise and interference at the receiver (expressed as a linear power ratio, not as logarithmic decibels); as shown in the Link Margin Calculator in TABLE 1 below for a 25 Watt power spread over 3.5 GHz of bandwidth with a power spectral density of −51.5 dBm/Hz (decibel milliwatts per Hertz) when arrays of the disclosed antenna are used for the transmitter and receiver with array gains of 16 dBi and 10 dBi (decibels relative to an isotropic radiator), respectively.

TABLE 1

Link Margin Calculator Showing 100 km Covert Comms Feasibility

| Item | Value | Units |
| --- | --- | --- |
| Receive Gain | 10.0 | dBi |
| Transmit Gain | 16.0 | dBi |
| Baseband Signal Bandwidth | 20 | kHz |
| Spread Bandwidth | 3.5 | GHz |
| Receiver Noise Figure | 4.0 | dB |
| Minimum Signal to Noise Ratio (SNR) | 3.0 | dB |
| Transmit Power | 25.0 | Watts |
| Covert Distance | 2.0 | meters |
| Max Distance | 100000.0 | meters |
| Thermal Noise Floor over Narrow BW | −130.9 | dBm |
| Thermal Noise Floor over Spread BW | −78.5 | dBm |
| Power Spectral Density of Narrow Signal | 1.0 | dBm/Hz |
| Power Spectral Density of Spread Signal | −51.5 | dBm/Hz |
| Despreading Gain | 52.4 | dB |
| Effective Isotropic Radiated Power | −35.5 | dBm/Hz |
| Minimum Detectable Signal | −123.9 | dBm/Hz |
| Space Loss at Covert Distance | 54.0 | dB |
| Space Loss at Max Distance | 148.0 | dB |
| Carrier to Noise Ratio at Covert Distance | −1.0 | dB |
| Link Margin at Max Distance | 2.9 | dB |
| Max Data Rate | 51.0 | kbps |

An antenna constructed as disclosed herein can employ a link having 1 million chips per bit encoding, which is provided by the direct-sequence spread-spectrum pseudo-noise code generated in a field programmable gate array (FPGA). The disclosed antenna's large instantaneous bandwidth allows very long encoding sequences to be used to provide coding gain to the communications channel that enable the signal to be retrieved from below the noise floor in a receiver. This level of security is unrivaled in current systems and undetectable by pushing broadcasts below the noise floor, while the disclosed antenna structure prevents distortion in the signal. This coding gain both enables stealthier performance and limits the channel data rate according to Nyquist Formula shown in the chart 600 of FIG. 6 for a 6000 MHz bandwidth BPSK wireless system. As a result, this capability can be used by Special Operations Forces (SOF) teams conducting operational preparation of the environment in semi-permissive or non-permissive locations where the risk of signal interception is high.

UAS: Drone-to-Ground Station Communication

Figure 6:
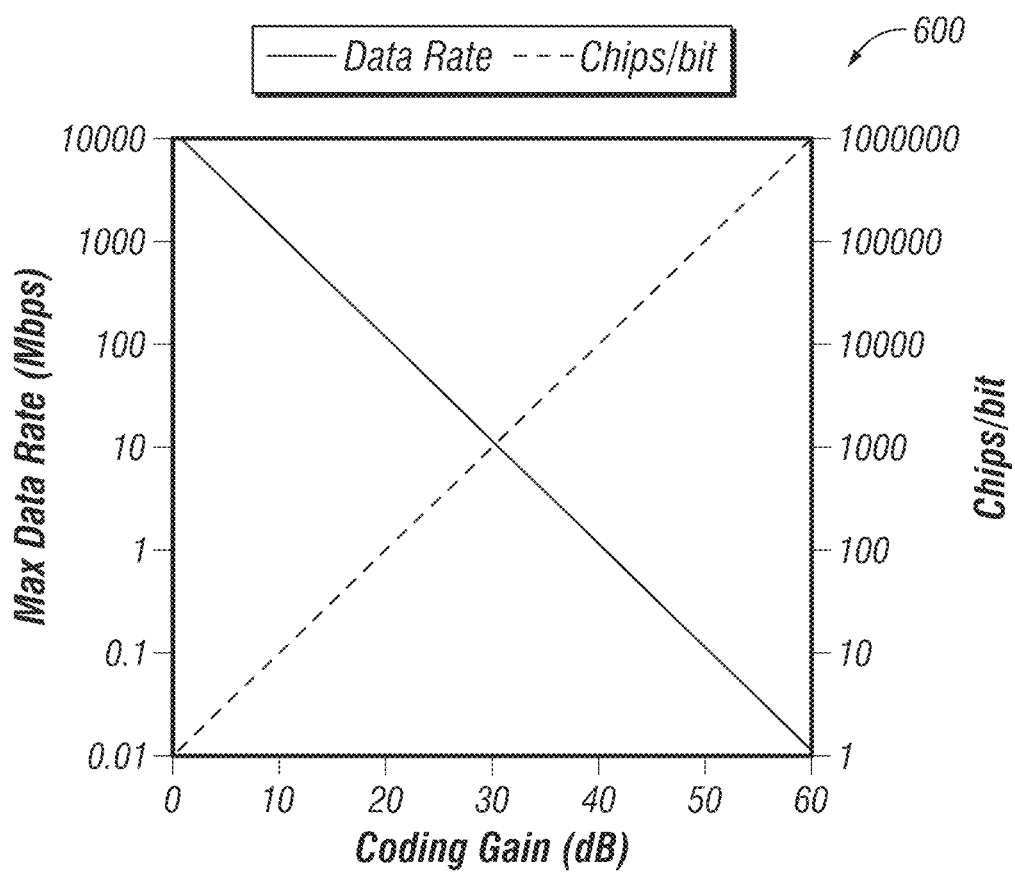
FIG. 6 illustrates a chart setting forth the coding gain according to Nyquist Formula of an antenna as disclosed herein employed in a 6000 MHz bandwidth BPSK wireless system.
Figure 7:
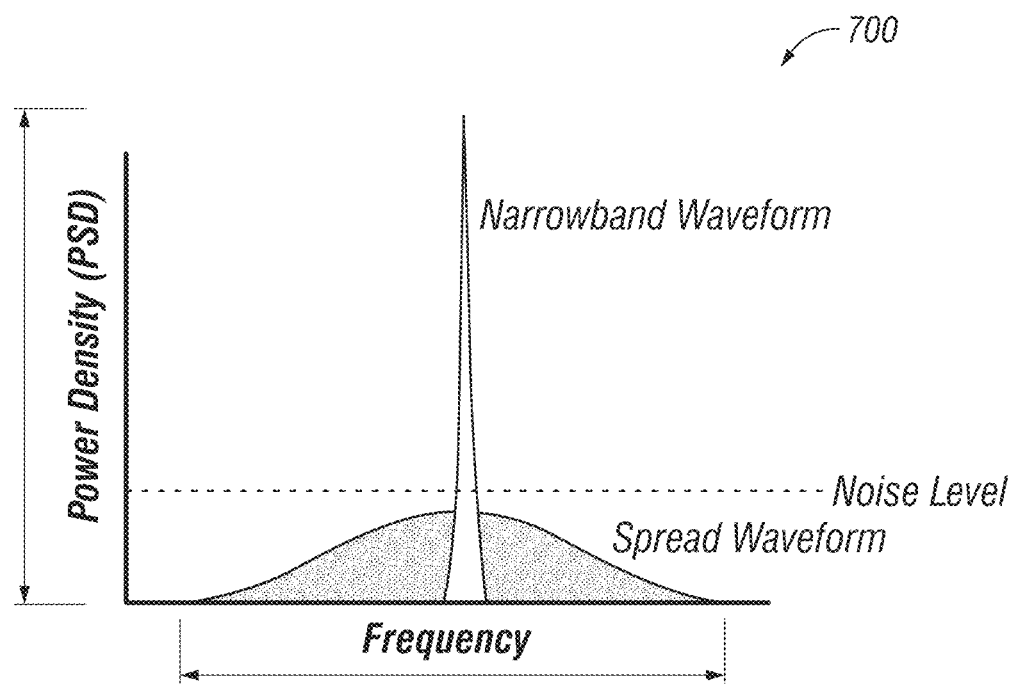
FIG. 7 illustrates a graph of the Power Spectral Density (PSD) of a narrowband signal spread across a large frequency range, causing that signal to become covert through an antenna as disclosed herein.

An antenna constructed as disclosed herein may further provide friendly drone electronic countermeasures and enhanced data transmission through the use of extremely broadband direct sequence spread spectrum (DSSS) signals that require a large instantaneous bandwidth to both recover intentional signals from below the noise floor and depress jammer signals, enabling both covert and anti-jam communications. FIG. 7 illustrates a graph 700 of the Power Spectral Density (PSD) of a typical narrowband signal versus the broadband spread spectrum signal containing the same signal energy, which is made possible through the use of an antenna as disclosed herein. As illustrated, a narrowband waveform operating at a specific frequency or across a small frequency range, as is found in conventional technology, provides high PSD, but this PSD extends well above the noise level. In contrast, disclosed antennas can operate across the entire spread spectrum, which for low data rate transmissions results in low PSD but operates entirely under the noise level. An antenna constructed as disclosed herein can also enable high resistance to jamming for low data rate communications, such as voice, text, and machine control signals, as well as position, navigation, and timing (PNT) information because the large instantaneous bandwidth available in the disclosed antenna structure enables coding gains up to 60 dB that can bring signals up from 1 million times below the noise floor (as shown in FIG. 6).

An antenna constructed as disclosed herein may be switched to a high data rate mode to transmit complex data in real-time (such as radar imagery). This would be accomplished by reducing the coding gain to increase the data rate as shown in FIG. 6. In addition to decreasing the coding gain, a different encoding scheme could be employed (1024 QAM instead of BPSK) to dramatically increase the data rate. However, in such high data rate mode, in some embodiments the wireless system could possibly reduce its ability to communicate covertly because the signal power levels would need to increase relative to the noise floor, potentially making the transmitted signals visible to third parties.

In some embodiments, such an antenna may also be switched to a communication mode at low data rates that are resistant to jamming because the coding gain used for bringing the intended signal up from the noise floor also depresses the power of jammer tones by the same amount through the mixing of pseudo-noise codes together with the radio frequency signal stream in either the FPGA or the RF front-end, such as the novel RF front-end mentioned above and incorporated herein by reference.

Signals Intelligence (SIGINT)

The large instantaneous bandwidth of an antenna as disclosed herein can enable new signal recordings for communications and unintentional hardware emissions to classify and track signals. Such signals intelligence (SIGINT) includes communications intelligence (COMINT) and electronic intelligence (ELINT)—intentional and unintentional signals. Moreover, direction finding (discussed below) is a subset of SIGINT.

Figure 8A:
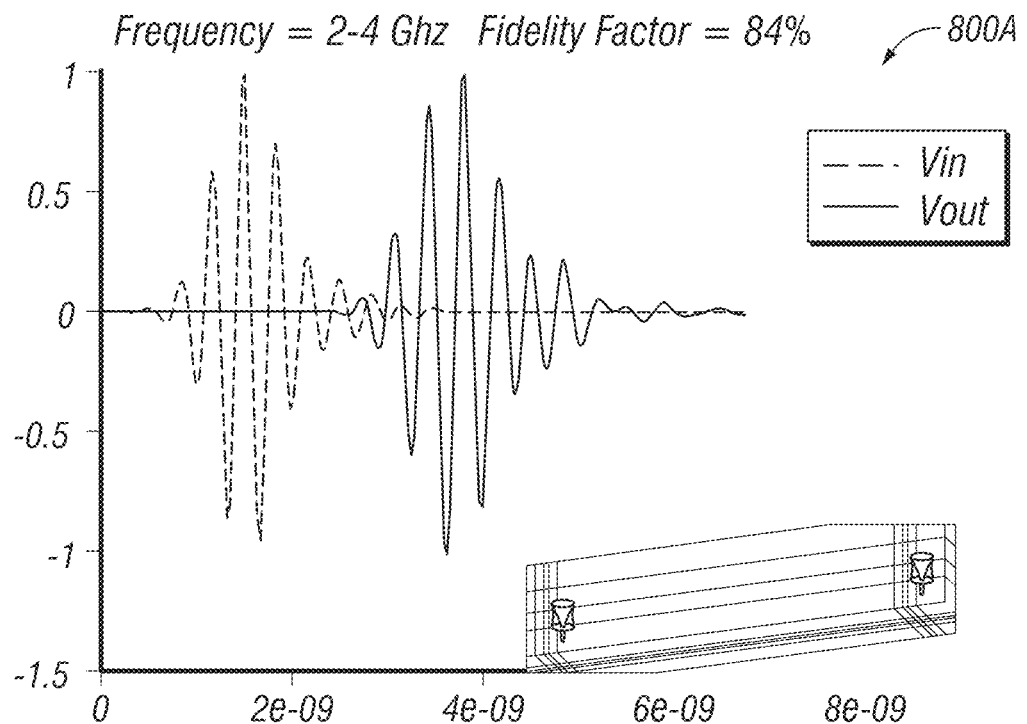
FIGS. 8A, 8B and 8C illustrate the large instantaneous bandwidth capabilities of a disclosed antenna by reducing distortion across large sections of bandwidth as indicated in the corresponding Fidelity Factor calculations.
Figure 8B:
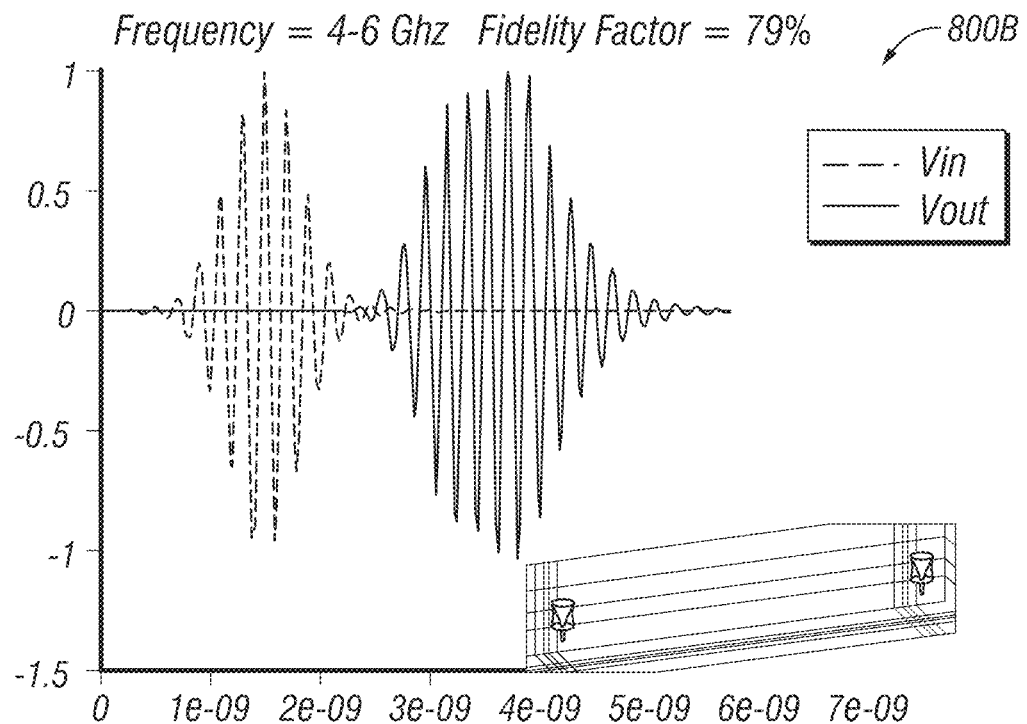
Figure 8C:
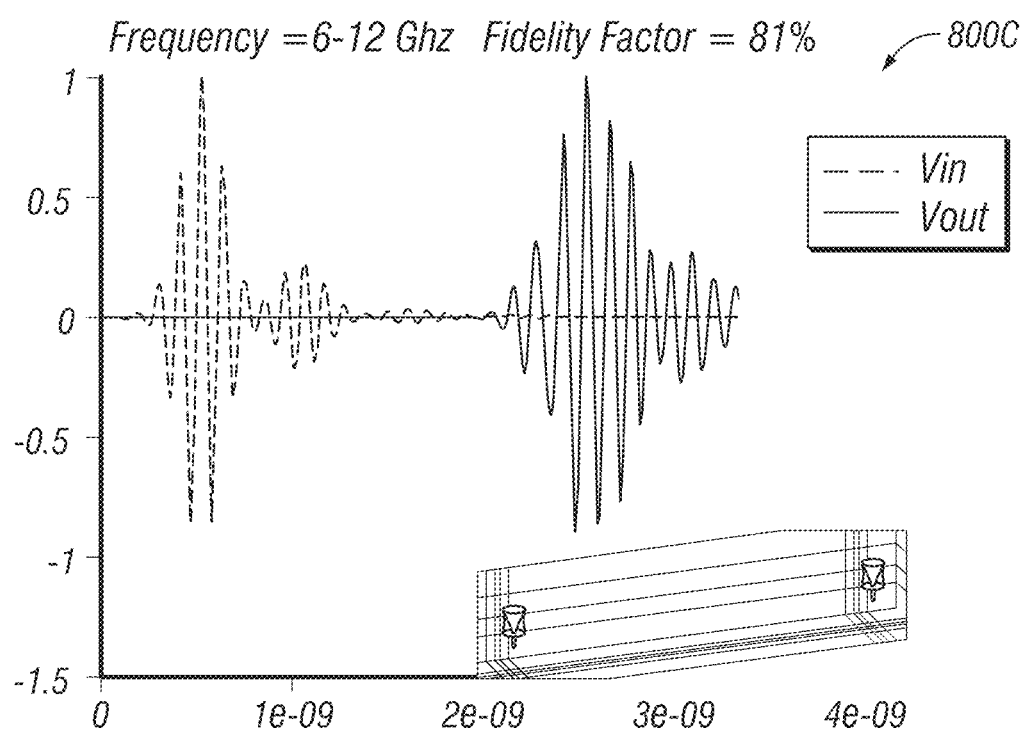

Disclosed antennas provide signals intelligence capabilities by reducing distortion across large sections of bandwidth as indicated in the Fidelity Factor calculations shown between three simulated antennas in the graphs (800A, 800B, 800C) presented in FIGS. 8A, 8B and 8C. For the graph 800A in FIG. 8A, a Gaussian pulse covering the 2-4 GHz bandwidth was generated and sent through one antenna to another antenna as disclosed, and the Fidelity Factor showing the similarity between the transmitted and received signals was calculated to be 84%. This means that the received signal maintained 84% of the transmit signal energy. The same calculation was performed for the graph 800B in FIG. 8B using a Gaussian pulse covering 4-6 GHz resulting in a Fidelity Factor of 79%. This calculation was also performed for the graph 800C in FIG. 8C using a Gaussian pulse covering 6-12 GHz, and the Fidelity Factor calculated was 81%. These calculations show that the disclosed antenna has better distortion performance in the 6-12 GHz range and worse distortion performance in the 2-6 GHz range.

Direction Finding—Enhanced Counter Drone Capability

Antennas designed and constructed as disclosed herein may be incorporated into portable radio systems as well. Exemplary advantageous applications in such portable systems may provide functionality to jam adversary drones, as well as to geolocate drone operators. This is possible with the disclosed antennas because the antennas provide a much larger instantaneous bandwidth than has been available in legacy jammers and geolocation systems.

Direction Finding—Platforms at Sea

The large instantaneous bandwidth provided by antennas as disclosed herein can also enable new wireless signal discovery and triangulation by allowing the recording of much broader signals than has been previously possible. For legacy systems, the frequency of interest was swept through time in order to discover persistent signals (e.g., modern conventional systems have a max swept bandwidth of 250 MHz, and not available at the same time), but the disclosed antenna structure enables large sections of its bandwidth to be seen instantaneously (up to 6000 MHz between 2-12 GHz). Legacy systems are unable to detect and record signals of short duration and large bandwidth due to the time required to sweep through various frequencies. The fractional bandwidth of a system is defined as the percentage of the center frequency of the system. Legacy systems have also been unable to detect and record persistent signals with more than 10% fractional bandwidth due to antenna bandwidth limitations in the past. With the disclosed antenna, signal intelligence systems can detect, record, and triangulate signals across its 143% fractional bandwidth (i.e., 10 GHz swept bandwidth across 2-12 GHz in the frequency spectrum).

Multi-Function Apertures

The large instantaneous bandwidth of disclosed antennas can also enable a single aperture to achieve multiple missions simultaneously, such as radar imaging, geolocating, tracking, communicating, and jamming by segmenting these multiple missions across orthogonal frequencies in various parts of an array of these disclosed antennas. Additionally, the disclosed technology may be implemented in Sensor Open System Architecture (SOSA) to reduce the deployment cost (and even the duration) of these various missions as deployed in a single platform. This would replace the need to deploy multiple mobile platforms to accomplish the same missions.

Radars and Emulators

The large instantaneous bandwidth available with antennas as disclosed herein also enable better performance for radars and emulators. In particular, broader bandwidth radars, such as a radar incorporating the disclosed principles, would have more capability to see stealthy targets. Likewise, emulators with broader bandwidth, such as emulators incorporating the disclosed principles, would have greater ability to test new radars as well.

Electronic Warfare

The large instantaneous bandwidth of disclosed antennas can also enable adaptive agility for electronic counter measures (ECM) and electronic counter-counter measures (ECCM) by targeting specific frequency bands within the large instantaneous bandwidth available with electromagnetic beams of various shapes according to the amplitude and phase applied to an array of these disclosed antennas. "Cat and mouse" digital radio frequency memories (DRFMs) for luring and fooling foreign radar systems may also be provided using disclosed antennas by listening to the foreign radar system frequencies being used in the environment and then responding with a frequency and shaped electromagnetic beam from an array of disclosed antennas that targets the direction and frequency of a foreign radar system.

Figure 9A:
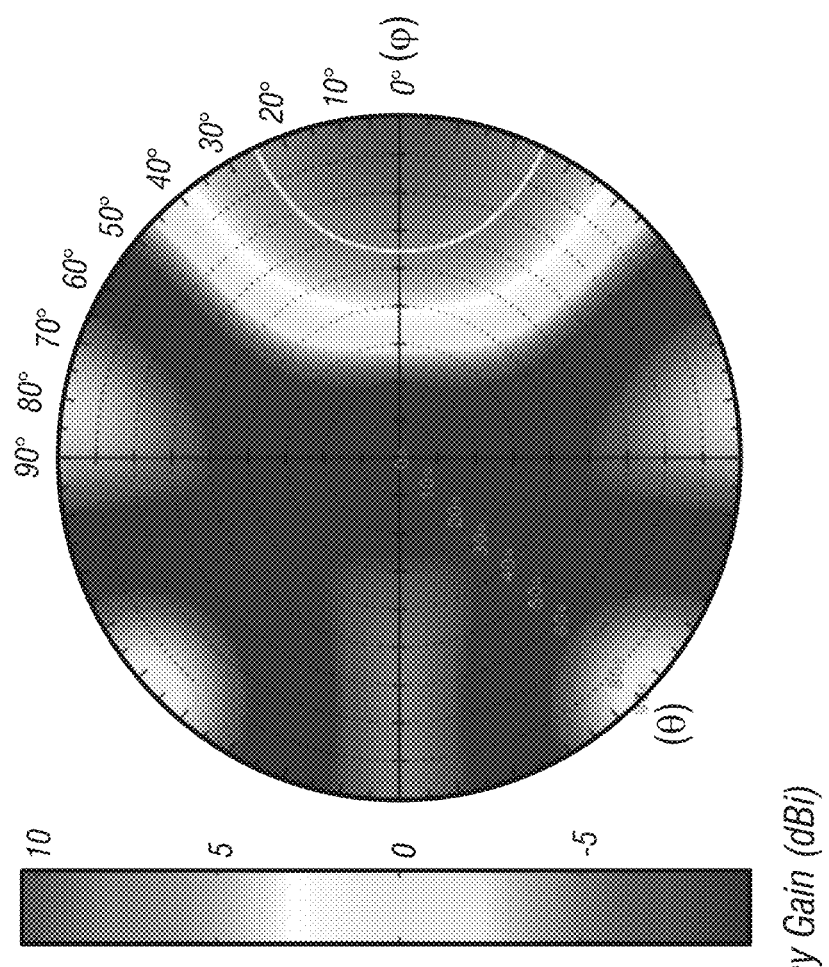
FIGS. 9A and 9B illustrate a 2-dimensional array gain of 7 equally spaced antennas as disclosed for drone-to-ground communications (FIG. 9A) and a 3-dimensional array gain of 28 equally spaced antennas as disclosed for ground-to-drone communications (FIG. 9B) as an example of a feasible array design for an airborne platform. The 3 dB beamwidths are shown by white contour lines on the 2D polar plots to distinguish the maximum from the minimum values.
Figure 9A:
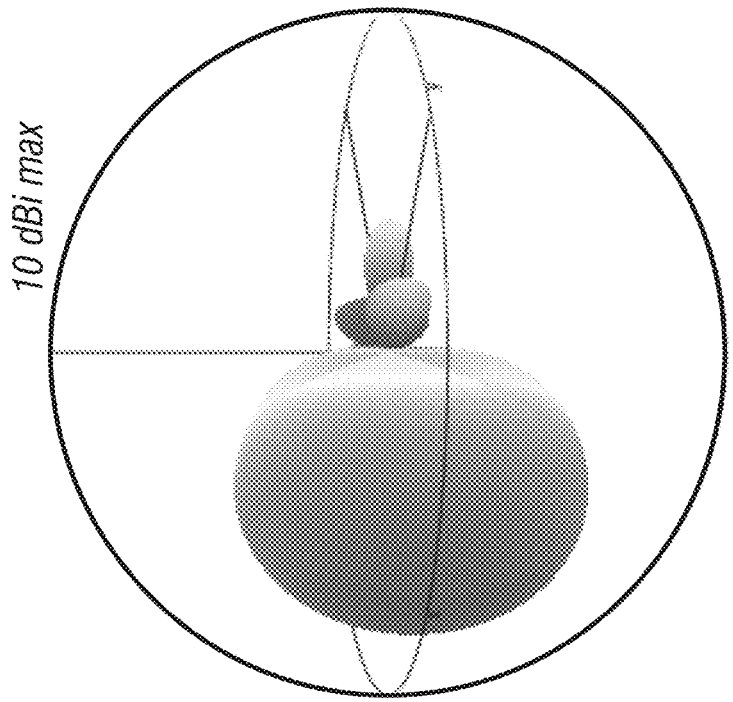

Using a 2-dimensional array of 7 equally spaced antennas as disclosed for air-to-ground communications enables a much longer range of communication while also being able to maintain communication during aviation maneuvers. FIG. 9A is given as an example of a 3-dimensional electromagnetic beam (array gain) produced by such an array located on an unmanned aerial vehicle (UAV) with a maximum array gain of 10 dBi. The large instantaneous bandwidth of the disclosed antenna allows this array to have much greater flexibility in its frequency range of operation while also enabling covert and anti-jam communications to prevent the UAV from being defeated by active jammers.

Figure 9B:
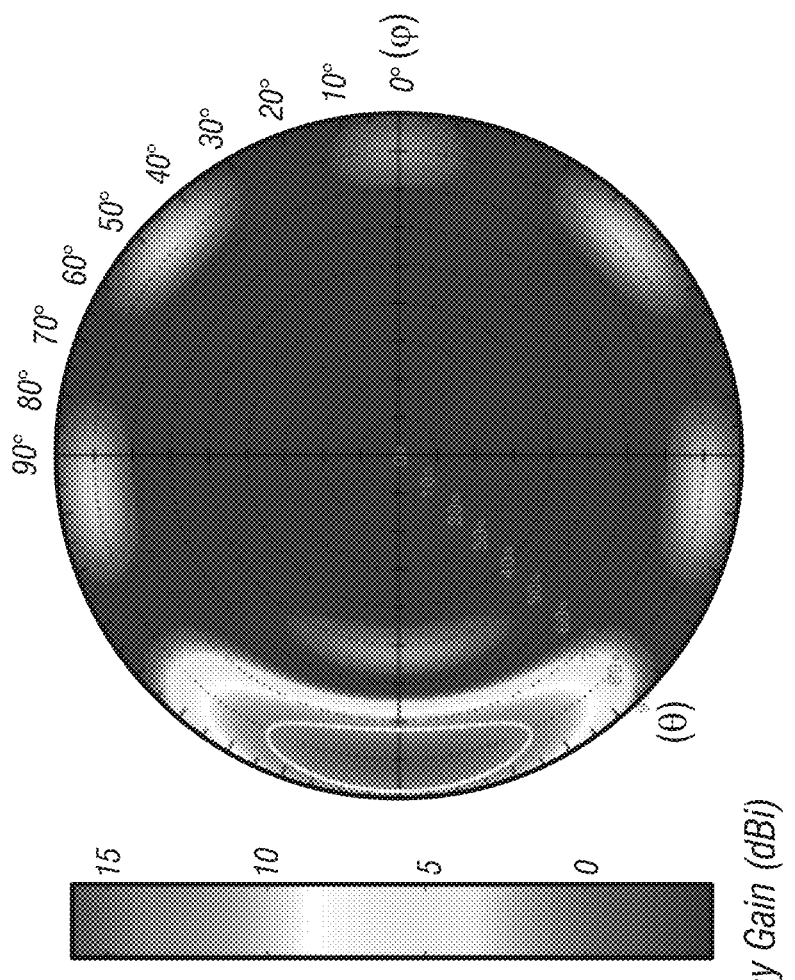
Figure 9B:
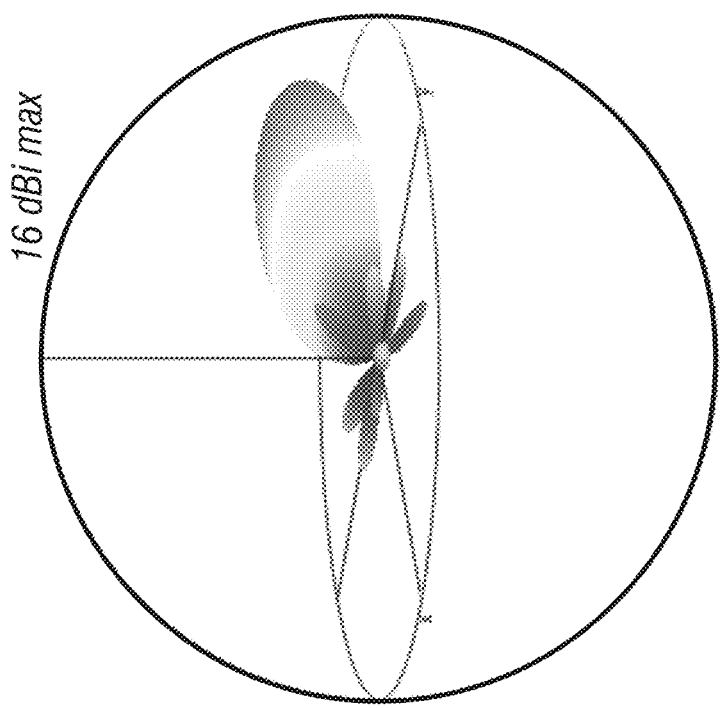

Using a 3-dimensional array of 28 equally spaced antennas as disclosed for ground-to-air communications enables a much longer range of communication with an airborne platform flying above the tree line at long ranges (e.g., up to 100 km away). FIG. 9B is given as an example of the 3-dimensional electromagnetic beam (array gain) produced by such an array located on the ground for communications with a UAV with a maximum array gain of 16 dBi. The large instantaneous bandwidth of the disclosed antenna allows this array to have much greater flexibility in its frequency range of operation while also enabling covert and anti-jam communications to prevent the UAV from being defeated by active jammers.

Figure 10:
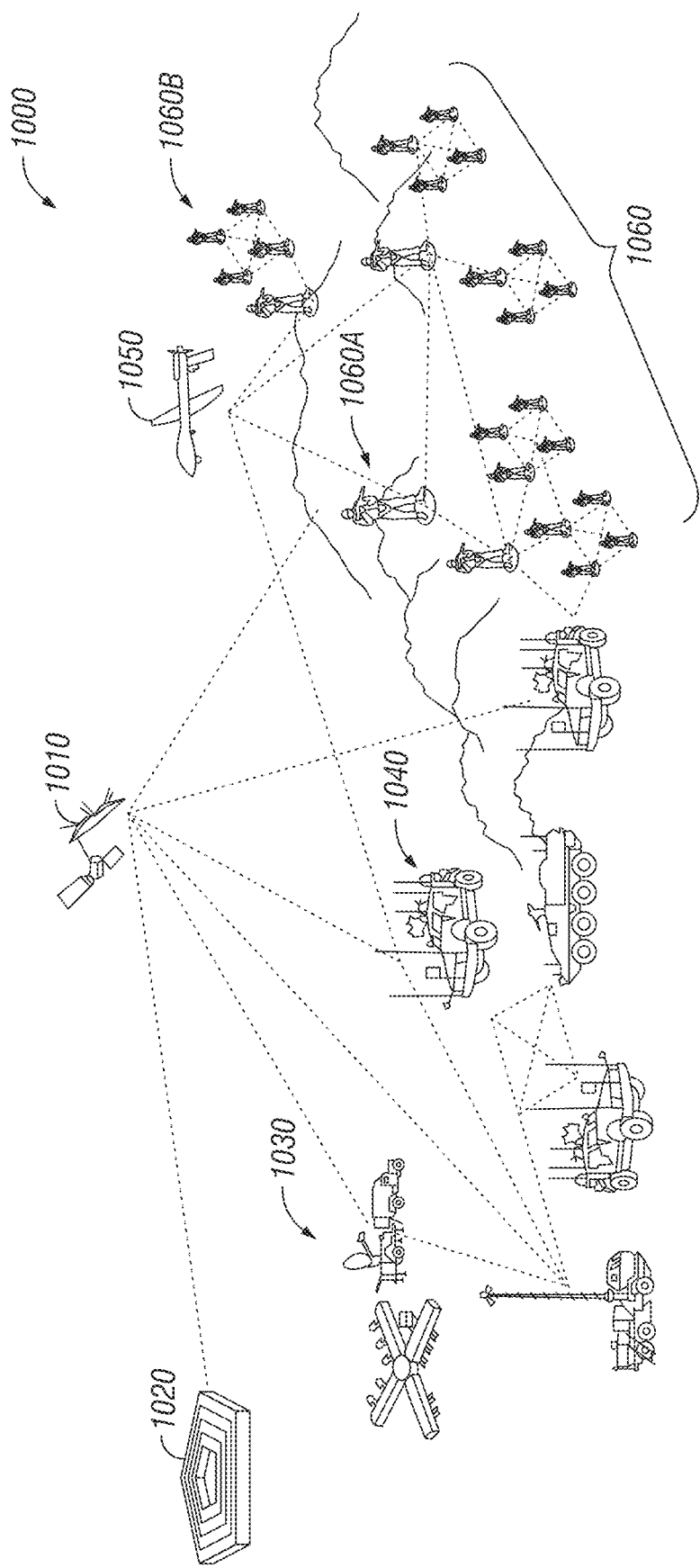
FIG. 10 illustrates an image that demonstrates multiple exemplary military applications achievable with a single antenna or antenna array according to the disclosed principles based on its large instantaneous wireless bandwidth within the 2-12 GHz frequency range, or any other suitable frequency range proportional to the design constraints.

Looking now at FIG. 10, illustrated is an image 1000 that demonstrates the multiple military applications achievable with a single antenna or antenna array according to the disclosed principles based on its ultrawide instantaneous bandwidth of 2-12 GHz. The disclosed antenna may be paired with a corresponding RF front-end system (described in the above-identified related U.S. patent application Ser. No. 17/300,416, filed Jun. 23, 2021) and mounted on a single vehicle, such as a military aircraft 1010. FIG. 10 illustrates an exemplary network of various wireless communications that may be employed by military personnel, where an antenna or array of antennas as disclosed herein may be implemented. More specifically, these various implementations may be done with the same, single embodiment of a disclosed antenna based on its uniquely expansive instantaneous available bandwidth of 2-12 GHz.

With conventional wideband antennas, the smaller instantaneous available bandwidth as compared to the disclosed antenna require multiple systems, each having its own antenna and small bandwidth range, in order to achieve the various illustrated military applications. Therefore, the compact nature of not only an antenna as disclosed herein, but also the fact that only a single RF front-end system (as disclosed in the related patent application reference above) having a disclosed antenna is needed for such various implementations, allows wireless communications systems implementing the disclosed principles to be made compact enough for individual soldiers to carry, as well as occupying minimal space in military vehicles and equipment.

Looking at the exemplary military implementations illustrated in FIG. 10, a satellite or satellite system 1010 is typically employed to relay wireless communications to and from a military headquarter location, such as the Pentagon 1020. These satellites can include Wideband Global SATCOM (WGS), Mobile User Objective System (MUOS), and other satellites and satellite networks, each of which may employ significantly different bandwidths that can be accommodated through dimensional scaling of the technology described herein.

Exemplary military mission applications achievable with a single antenna/system as provided herein include communications across the Warfighter Information Network-Tactical (WIN-T) platforms. Moreover, the bandwidth of a single disclosed antennas/systems can operate both on equipment and vehicles employing the WIN-T Increment 1 ("At-the-Halt") platform 1030 and on equipment and vehicles employing the WIN-T Increment 2 ("On-the-Move") platform 1040. Also, military mission applications for the disclosed technology can include ariel implementations 1050, such as manned aircrafts and unmanned combat aerial vehicle (UCAV—"drones"). Furthermore, the disclosed technology may be implemented with dismounted soldiers 1060. These include Handheld, Manpack and Small Form Fit (HMS) packs carried by various dismounted soldiers 1060A, including the HMS packs carried by riflemen 1060A.

Additionally, exemplary military applications achievable with a single antenna/system as provided herein include air-to-air target detection/tracking, Synthetic-Aperture Radar (SAR) with effective Battle Damage Assessment (BDA), cruise missile detection/tracking, drone detection/tracking, and ground moving target detection on both land and water. Moreover, wirelessly linked aircraft may have an antenna/antenna array using the disclosed principles, where only one aircraft need have the disclosed technology, and then communicate the obtained information to other aircraft. Of course, numerous other military applications are also possible with an antenna and associated system as provided herein where the large instantaneous wireless bandwidth within the 2-12 GHz frequency range provided by the disclosed principles provides a strategic advantage. The design principles herein may be scaled to any other frequency range with similar proportionality relative to the frequency bounds and physical design size.

While this invention has been particularly shown and described with reference to preferred embodiments, it will be understood by those skilled in the art that various changes in form and detail may be made therein without departing from the spirit and scope of the invention. The inventor expects skilled artisans to employ such variations as appropriate, and the inventor intends the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary of the Invention" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An omni-directional low distortion broadband coaxial horn antenna, comprising:
    a dielectric component comprised of a radio frequency transparent material, said dielectric component comprising:
        a longitudinally extending exterior surface having a hyperboloid of one sheet shape;
        an aperture longitudinally extending from a top to a bottom of said dielectric component, said aperture defining an interior surface having a frusto-pseudo-sphere shape where a top opening of the aperture is greater than a bottom opening of the aperture; and
    a base having said bottom opening at its center, said base comprising:

a flat inner portion extending outwardly from said bottom opening, and
a curved portion having a parabolic shape curving upward toward said top of the dielectric component and extending outwardly from the flat portion to the exterior surface of the dielectric component;
an electrical conductor disposed on said interior surface; and
an electrical conductor disposed on said curved portion of said base.

2. The antenna of claim 1, wherein said curved portion of said base comprises a non-linear curvature defined by the equation:

$$d_1(i) = dBase \cdot \sin(\pi \cdot sFreq \cdot (i-1))$$

$$x(i) = \frac{xvar}{2} + \frac{\left(widRad - \frac{xvar}{2}\right) \cdot (i-1)}{ePoints - 1} + d_1(i) \cdot \sin\theta_1$$

$$z(i) = 0 + \frac{(zvar - 0) \cdot (i-1)}{ePoints - 1} - d_1(i) \cdot \cos\theta_1$$

where:
$d_1$ is the curvature of the curved portion of the base with its vector components split between the x and z dimensions, according to the elevation angle $\theta_1$;
x is location along the x-axis;
z is location along the z-axis;
i is a point index for the drawing tool used to create the non-linear curvature;
dBase is the peak amplitude of $d_1$;
ePoints is an arbitrarily selected number of points along the curve dBase;
sFreq is a spatial frequency with relationship to the total number of ePoints;
widRad is the radius of the top of the dielectric component;
height is the longitudinal height of the dielectric component;
xvar is the diameter of the circular plane on the x-y axis located at z=0; and
zvar is the height of the last point in the curved portion of the base at the exterior surface as measured from the flat inner portion.

3. The antenna of claim 1, wherein said exterior surface comprises a non-linear curvature defined by the equation:

$$d_2(i) = dDiel \cdot \sin(\pi \cdot sFreq \cdot (i-1))$$

$$x(i) = widRad + d_2(i) \cdot \sin\theta_2$$

$$z(i) = zvar + \frac{(height - zvar) \cdot (i-1)}{ePoints - 1} - d_2(i) \cdot \cos\theta_2$$

where:
$d_2$ is the curvature of the exterior surface with its vector components split between the x and z dimensions, according to the elevation angle $\theta_2$;
x is location along the x-axis;
z is location along the z-axis;
i is a point index for the drawing tool used to create the non-linear curvature;
dDiel is the peak amplitude of $d_2$;
ePoints is an arbitrarily selected number of points along the curve dDiel;
sFreq is a spatial frequency with relationship to the total number of ePoints;
widRad is the radius of the top of the dielectric component;
height is the longitudinal height of the dielectric component; and
zvar is the height of the last point in the curved portion of the base at the exterior surface as measured from the flat inner portion.

4. The antenna of claim 1, wherein said interior surface comprises a non-linear curvature defined by the equation:

$$d_3(i) = dConvex \cdot \sin(\pi \cdot sFreq \cdot (i-1))$$

$$x(i) = widRadTop + \frac{(pRef - widRadTop) \cdot (i-1)}{ePoints - 1} + d_3(i) \cdot \sin\theta_3$$

$$z(i) = height + \frac{(0 - height) \cdot (i-1)}{ePoints - 1} - d_3(i) \cdot \cos\theta_3$$

where:
$d_3$ is the curvature of the interior surface with its vector components split between the x and z dimensions, according to the elevation angle $\theta_3$;
x is location along the x-axis;
z is location along the z-axis;
i is a point index for the drawing tool used to create the non-linear curvature;
dConvex is the peak amplitude of $d_3$;
ePoints is an arbitrarily selected number of points along the curve dConvex;
sFreq is a spatial frequency with relationship to the total number of ePoints;
widRadTop is the radius of the top opening of the aperture;
height is the longitudinal height of the dielectric component; and
pRef is the radius of the bottom opening of the aperture.

5. The antenna of claim 1, wherein the radio frequency transparent material comprises polycarbonate.

6. The antenna of claim 1, wherein the radio frequency transparent material comprises polytetrafluoroethylene (PTFE).

7. The antenna of claim 1, wherein said electrical conductor disposed on said interior surface or said electrical conductor disposed on said curved portion comprises metallic paint.

8. The antenna of claim 1, wherein said electrical conductor disposed on said interior surface or said electrical conductor disposed on said curved portion comprises electroplating.

9. The antenna of claim 1, wherein said electrical conductor disposed on said interior surface and said electrical conductor disposed on said curved portion are the same material.

10. The antenna of claim 1, wherein height and width/diameter of the dielectric component is sized 2.7 cm×2.7 cm.

11. A method of manufacturing an omni-directional low distortion broadband coaxial horn antenna, the method comprising:
forming a dielectric component comprised of a radio frequency transparent material, said dielectric component comprising:
a longitudinally extending exterior surface having a hyperboloid of one sheet shape;
an aperture longitudinally extending from a top to a bottom of said dielectric component, said aperture defining an interior surface having a frusto-pseudo-sphere shape where a top opening of the aperture is greater than a bottom opening of the aperture; and a base having said bottom opening at its center, said base comprising:
- a flat inner portion extending outwardly from said bottom opening, and
- a curved portion having a parabolic shape curving upward toward said top of the dielectric component and extending outwardly from the flat portion to the exterior surface of the dielectric component;

disposing an electrical conductor on said interior surface; and disposing an electrical conductor on said curved portion of said base.

12. The method of claim 11, wherein forming said dielectric component comprises forming said curved portion of said base using a non-linear curvature defined by the equation:

$$d_1(i) = dBase \cdot \sin(\pi \cdot sFreq \cdot (i-1))$$

$$x(i) = \frac{xvar}{2} + \frac{\left(widRad - \frac{xvar}{2}\right) \cdot (i-1)}{ePoints - 1} + d_1(i) \cdot \sin\theta_1$$

$$z(i) = 0 + \frac{(zvar - 0) \cdot (i-1)}{ePoints - 1} - d_1(i) \cdot \cos\theta_1$$

where:
- $d_1$ is the curvature of the curved portion of the base with its vector components split between the x and z dimensions, according to the elevation angle $\theta_1$;
- x is location along the x-axis;
- z is location along the z-axis;
- i is a point index for the drawing tool used to create the non-linear curvature;
- dBase is the peak amplitude of $d_1$;
- ePoints is an arbitrarily selected number of points along the curve dBase;
- sFreq is a spatial frequency with relationship to the total number of ePoints;
- widRad is the radius of the top of the dielectric component;
- height is the longitudinal height of the dielectric component;
- xvar is the diameter of the circular plane on the x-y axis located at z=0; and
- zvar is the height of the last point in the curved portion of the base at the exterior surface as measured from the flat inner portion.

13. The method of claim 11, wherein forming said dielectric component comprises forming said exterior surface using a non-linear curvature defined by the equation:

$$d_2(i) = dDiel \cdot \sin(\pi \cdot sFreq \cdot (i-1))$$

$$x(i) = widRad + d_2(i) \cdot \sin\theta_2$$

$$z(i) = zvar + \frac{(height - zvar) \cdot (i-1)}{ePoints - 1} - d_2(i) \cdot \cos\theta_2$$

where:
- $d_2$ is the curvature of the exterior surface with its vector components split between the x and z dimensions, according to the elevation angle $\theta_2$;
- x is location along the x-axis;
- z is location along the z-axis;
- i is a point index for the drawing tool used to create the non-linear curvature;
- dDiel is the peak amplitude of $d_2$;
- ePoints is an arbitrarily selected number of points along the curve dDiel;
- sFreq is a spatial frequency with relationship to the total number of ePoints;
- widRad is the radius of the top of the dielectric component;
- height is the longitudinal height of the dielectric component; and
- zvar is the height of the last point in the curved portion of the base at the exterior surface as measured from the flat inner portion.

14. The method of claim 11, wherein forming said dielectric component comprises forming said interior surface using a non-linear curvature defined by the equation:

$$d_3(i) = dConvex \cdot \sin(\pi \cdot sFreq \cdot (i-1))$$

$$x(i) = widRadTop + \frac{(pRef - widRadTop) \cdot (i-1)}{ePoints - 1} + d_3(i) \cdot \sin\theta_3$$

$$z(i) = height + \frac{(0 - height) \cdot (i-1)}{ePoints - 1} - d_3(i) \cdot \cos\theta_3$$

where:
- $d_3$ is the curvature of the interior surface with its vector components split between the x and z dimensions, according to the elevation angle $\theta_3$;
- x is location along the x-axis;
- z is location along the z-axis;
- i is a point index for the drawing tool used to create the non-linear curvature;
- dConvex is the peak amplitude of $d_3$;
- ePoints is an arbitrarily selected number of points along the curve dConvex;
- sFreq is a spatial frequency with relationship to the total number of ePoints;
- widRadTop is the radius of the top opening of the aperture;
- height is the longitudinal height of the dielectric component; and
- pRef is the radius of the bottom opening of the aperture.

15. The method of claim 11, wherein forming said dielectric component from a radio frequency transparent material comprises forming said dielectric component from polycarbonate.

16. The method of claim 11, wherein forming said dielectric component from a radio frequency transparent material comprises forming said dielectric component from polytetrafluoroethylene (PTFE).

17. The method of claim 11, wherein disposing said electrical conductor on said interior surface or disposing said electrical conductor on said curved portion comprises disposing metallic paint on said interior surface or said curved portion.

18. The method of claim 11, wherein disposing said electrical conductor on said interior surface or disposing said electrical conductor on said curved portion comprises electroplating said interior surface or said curved portion.

19. The method of claim 11, wherein disposing said electrical conductor on said interior surface or disposing said electrical conductor on said curved portion comprises disposing the same material on said interior surface and said curved portion.

20. The method of claim 11, wherein forming said dielectric component comprise forming said dielectric component having a height and width/diameter of 2.7 cm×2.7 cm.

\* \* \* \* \*